United States Patent

[11] 3,536,228

| [72] | Inventor | Kay L. Ruggles<br>Salt Lake City, Utah |
| --- | --- | --- |
| [21] | Appl. No. | 761,757 |
| [22] | Filed | Sept. 23, 1968 |
| [45] | Patented | Oct. 27, 1970 |
| [73] | Assignee | American Standard Inc.<br>New York, New York<br>a corporation of Delaware |

[54] TANK AND METHOD FOR MANUFACTURE THEREOF
4 Claims, 5 Drawing Figs.

[52] U.S. Cl. ........................................................ 220/71,
156/293, 206/2
[51] Int. Cl. ........................................................ B65d 7/42
[50] Field of Search ........................................ 220/71, 83;
206/2; 161/231, 233, (Polyester Digest), (Filler Digest),
(Glass Fiber Digest); 156/293, 294

[56] References Cited
UNITED STATES PATENTS

| 1,431,471 | 10/1922 | Lehr............... | 206/2X |
| --- | --- | --- | --- |
| 1,538,818 | 5/1925 | Johnston et al... | 206/2X |
| 2,642,920 | 6/1953 | Simon et al....... | 161/231X |
| 3,054,703 | 9/1962 | Beasure........... | 206/(Mat. Dig.)UX |
| 3,070,817 | 1/1963 | Kohrn et al...... | 220/83UX |
| 3,210,230 | 10/1965 | Tyhurst........... | 161/(Glass Fab.)UX |
| 3,298,554 | 1/1967 | Picker............ | 220/9(F)UX |
| 3,420,729 | 1/1969 | Roberts.......... | 161/231X |

FOREIGN PATENTS

| 729,448 | 3/1966 | Canada ................. | 220/83 |
| --- | --- | --- | --- |

Primary Examiner—Joseph R. Leclair
Assistant Examiner—James R. Garrett
Attorneys—Tennes I. Erstad and Robert G. Crook ABSTRACT: The invention comprises a self-sustaining acid holding tank made up of a composite sandwich having high tensile skins and a high compressive core and wherein internal and external reinforcing ribs are provided which run lengthwise along the length and up and down the sides and across the bottom of the tank. The upper rim of the tank is made heavier to take up wear and support heavy objects thereon. The invention also comprises a method for making the type of tank described.

Patented Oct. 27, 1970
3,536,228
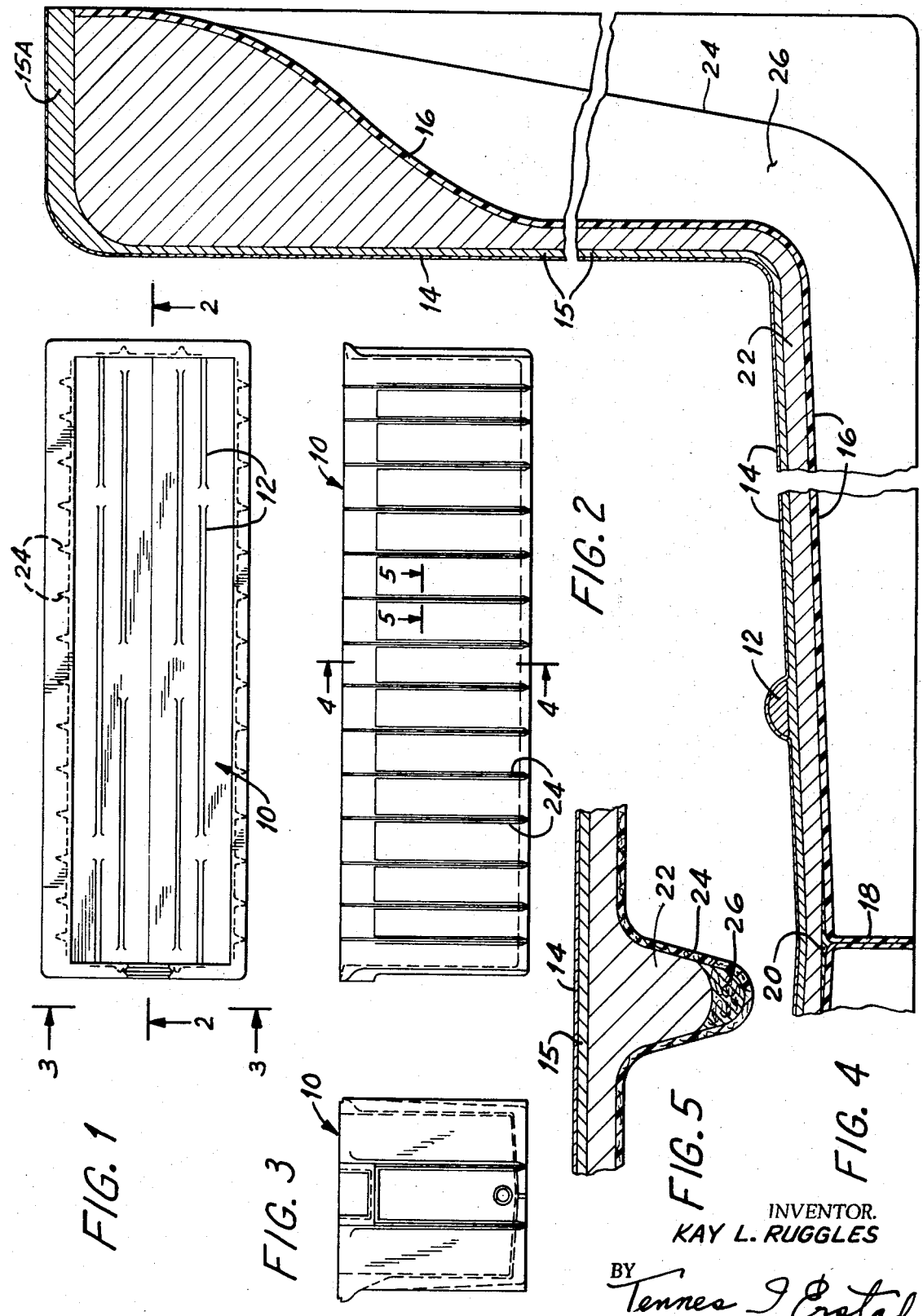
INVENTOR.
KAY L. RUGGLES
BY Tennes J Erstad 3,536,228

TANK AND METHOD FOR MANUFACTURE THEREOF

This invention relates to acid holding tanks and to a method for fabricating the same.

Sulfuric, hydrochloric and other corrosive acid holding tanks have in the past usually been made from concrete or steel and have been provided with an inner liner made from lead or acid resisting plastic. Whenever the lead or plastic liner eroded or became pierced by falling objects, the acid would attack the concrete walls of the holding tank. This necessitated replacing not only the liner but also the concrete tank. Even if the lead liner did not become pierced, the concrete or steel in a sulfuric acid environment gradually deteriorates. The tanks were cumbersome, expensive, and heavy, and possibly dangerous if the corrosive effects of the acid on the steel tank structure went undetected. The replacement or repair of the tanks as well as that of the liners was expensive and time consuming.

While the advantages of making an electrolytic tank from plastic are clear, the tanks would have to be strong enough to carry a 30,000 pound load of electrodes in addition to the electrolyte, and this presented a considerable number of problems.

Since reinforced plastic is a low modulus and a relatively expensive material when compared to steel reinforcing material, the economical way to increase stiffness is to increase section modulus. To increase part thickness alone is very costly. To use solid laminated structural plastic shapes instead of structural steel would also be costly in materials as well as fabrication time. Conventional plastic reinforcing materials resistant to the corrosive effects of acid, such as foam, wood and honeycomb, were costly to fabricate and could nor stand long term fluctuating thermal and mechanical loads. For these reasons, the use of an all plastic tank for electrolytic tanks have heretofore not been economical and have not been practical to construct.

The present invention has solved these problems by making a plastic tank in the form of a composite sandwich. The composite tank embodying the present invention is made of high tensile strength inner and outer skins of fiber reinforced plastic with a high compressive core made from plastics reinforced with a lightweight mineral filler and silica flour which is cast in place.

It is therefore one of the purposes of the present invention to provide a relatively lightweight, corrosive acid holding tank, such as is used for electrolytic baths in plating, cleaning or pickling metal.

A further object is to provide a tank which will be strong, rigid and made from plastic to serve as an acid bath for metal articles undergoing electroplating, cleaning, or pickling.

Another object is to provide a free-standing tank which can be made of a reinforced plastic construction so it can be made from plastics without the need for outer concrete, steel, structural supports, or lead inner liners.

Other objects and features of the present invention will become apparent from the following detailed description considered in connection with the accompanying drawings which disclose a few embodiments of the invention. It should be understood, however, that the drawings are designed for the purpose of illustration only and not as a definition of the limits of the invention as to which reference should be made to the appended claims.

FIG. 1 is a top view of my fiberglass acid holding tank.

FIG. 2 is a side view taken on line 2-2 of FIG. 1.

FIG. 3 is an end view taken on line 3-3 of FIG. 2.

FIG. 4 is a partial cross-sectional view taken on line 4-4 of FIG. 2.

FIG. 5 is a partial cross-sectional view taken on line 5-5 of FIG. 2.

The tank shown in the drawings used to illustrate my invention and the manner of manufacture may be briefly described as follows:

A mold (not shown) having a configuration that corresponds to the inner surface of the tank, shown in FIGS. 1 and 4, is provided, on which the inner skin or surface of the tank is formed. This mold surface 10, which is finished to the texture desired, is first cleaned and then coated with a separating finish, such as wax. A .30 mm. bisphenol-A polyester gel coat 14 is then applied to the waxed surface of the mold.

The mold has longitudinally extending grooves formed therein for receiving unidirectional reinforcement such as continuous strand fiberglass roving which is saturated with isophthalic polyester resin to form ribs extending along the bottom of the tank. The roving is placed in the grooves and built up as necessary not to exceed the level where it is flush with the surrounding surfaces of the mold, and then the resin mentioned is added to form ribs 12. The continuous filament fiberglass roving that forms the reinforcement in the ribs 12 is impregnated with isophthalic polyester resin. The tensil strength of this reinforced plastic is 95,000 to 110,000 lbs. per square inch.

This roving, after it has been placed in the grooves, is worked over with squeeges to bring the air bubbles to the surface.

When this layer has become tacky, a bisphenol BPA polyester resin 15 reinforced with a chopped strand fiberglass or .100—.125 chopped glass reinforced BPA polyester is then added over the gel coat and roving just described. This layer or skin 15 is built up to a thickness which provides a tensil strength when set of 12,000 to 15,000 p.s.i. The thickness of the skin 15A, at the upper rim surface may be made heavier than the skin of the inner bottom and vertical sidewalls, to take up the abrasive wear which the tank may be subjected to when electrodes or other objects are supported or dropped thereon. When the roving, the fiberglass mat and chopped glass fibers are thoroughly impregnated with polyester resin and all air bubbles have been removed therefrom, it is then allowed to set.

The outer skin 16 is constructed in a similar manner on a corresponding mold whose surface corresponds to the outer surface of the outer skin. The mold for the outer skin is provided with grooves for forming the outer ribs 24. Because of the size and shape of the tank, it might be cumbersome to make up the outer skin in one piece. The outer skin may therefore be made up in several sections, which are joined together to form a complete assembly forming the outside skin of the tank.

As mentioned, the outer mold is prepared in a manner similar to that described in connection with the inner mold, namely, the mold is first cleaned, and then waxed to facilitate separation of the molded product from the mold. A .30 mm. bisphenol-A polyester gel coat is then sprayed or painted on the mold.

A fiberglass mat is then added to the gel coat when it is tacky. Unistrand fiberglass roving is laid up in the trough of the grooves as shown in FIG. 5 to form ribs 24. Isophthalic polyester resin, reenforced with chopped strand fiberglass and unidirectional fiberglass roving is then applied by a suitable spray gun or by hand and the outer shell or skin 16 is built up to the thickness desired. This resin and fiberglass is then rolled and squeeged to remove air bubbles therefrom, and then allowed to set. When the outer shell 16 is made up in several sections, the edges of the two sections which will abut each other are provided with flanges 18.

When the outer shell is made up in sections, the several adjoining flanges 18 are assembled together and a polyester resin is added to the flange surface 18 and both flanges 18 are pressed together so they will adhere to each other as shown in FIG. 4. In addition, polyester 20 is added to the top of the flanges 18 to further bond the sections as is also shown in FIG. 4. When the sections of the outer shell have been joined together, the shell is then ready to be assembled with the inner shell to form a tank with a hollow space therebetween.

The tank is then turned up-side-down.

A hole is formed in the bottom of the outside shell of the tank. The core material is poured through this hole so that the cavity, a hollow space in between the inner skin 15 and outer skin 16 is filled with the core material 22. The core material 22 consists of an isophthalic polyester resin, reinforced with an inert lightweight mineral filler such as silica aggregate and silica flour. The compressive strength of the core material is 20,000 per sq. inch. To settle the core material in the hollow space between the inner and outer shells 15 and 16 and to facilitate the removal of air bubbles therefrom, the spaced shells may be vibrated and rocked as it is filled with the core material 22.

It will be noted that in FIG. 4, the upper walls of the tank are of a much thicker configuration than the side and bottom walls. This has the advantage of giving the tank rigidity when supporting electrodes on the upper rim of the tank in addition to the electrolyte when it is in use.

While this invention has been described with reference to certain preferred embodiments of the invention, these are illustrative only, as many alternatives and equivalents will readily occur to those skilled in the art, without departing from the spirit or proper scope of the invention. The invention is therefore not to be construed as limited, except as set forth in the appended claims.

I claim:

1. An open top acid holding tank comprising an inner fiberglass reinforced plastic shell, an outer fiberglass reinforced plastic shell spaced from the inner shell and forming a space therebetween and a polyester resin having a filler mixed therewith and disposed in between said inner and outer shells and bonded thereto, and wherein the tank has a bottom and upwardly extending sidewalls, and outwardly extending ribs formed along the bottom thereof which are made up of unidirectional fiberglass roving having the interstices thereof filled with polyester resin;

2. An open top acid holding tank comprising an inner fiberglass reinforced plastic shell, an outer fiberglass reinforced plastic shell spaced from the inner shell and forming a space therebetween and a polyester resin having a filler mixed therewith and disposed in between said inner and outer shells and bonded thereto, and wherein unidirectional fiberglass roving and polyester resin inwardly extending reinforced ribs are formed in the inner shell of the tank which ribs extend lengthwise of the tank and wherein outwardly extending ribs are formed in the sidewalls of the outer shell which ribs extend in a plane transverse to the plane the ribs formed in the inner shell extend.

3. An open top acid holding tank comprising an inner fiberglass reinforced plastic shell, an outer fiberglass reinforced plastic shell spaced from the inner shell and forming a space therebetween and a polyester resin having a filler mixed therewith and disposed in between said inner and outer shells and bonded thereto, and wherein the distance between the inner and outer shells at their top edges is at least four times as great as the distance between the shells at their lowermost portion of the shells.

4. An open top acid holding tank comprising an inner fiberglass reinforced plastic shell, an outer fiberglass reinforced plastic shell spaced from the inner shell and forming a space therebetween and a polyester resin having a filler mixed therewith and disposed in between said inner and outer shells and bonded thereto, and wherein the outer shell has ribs made from unidirectional resin reinforced fiberglass which extend outwardly from the outer shell and up and down and under the outside of the tank so as to support the tank when it is seated on the floor, and the inner shell has unidirectional resin reinforced fiberglass ribs formed in the inner shell and extending along a length thereof to provide reinforcing for the tank.